United States Patent
Jasper et al.

(10) Patent No.: US 7,742,440 B2
(45) Date of Patent: Jun. 22, 2010

(54) NETWORKS AND METHODS INTEGRATING DIGITAL MOBILE STANDARDS

(75) Inventors: Dan Jasper, Oregon City, OR (US); Cathy Wise, Bothell, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/256,299

(22) Filed: Oct. 22, 2008

(65) Prior Publication Data
US 2009/0046651 A1 Feb. 19, 2009

Related U.S. Application Data

(62) Division of application No. 10/445,173, filed on May 23, 2003, now Pat. No. 7,453,901.

(60) Provisional application No. 60/383,477, filed on May 24, 2002.

(51) Int. Cl.
*H04B 7/00* (2006.01)
*H04L 12/28* (2006.01)

(52) U.S. Cl. .................. 370/310; 370/351; 370/431
(58) Field of Classification Search .................. 370/310
See application file for complete search history.

(56) References Cited

U.S. PATENT DOCUMENTS

| | | | |
|---|---|---|---|
| 6,396,827 B1 | 5/2002 | Paivike et al. | |
| 6,430,186 B1 * | 8/2002 | Smetana et al. | 370/395.4 |
| 6,912,230 B1 | 6/2005 | Salkini et al. | |
| 6,963,552 B2 * | 11/2005 | Sabat et al. | 370/338 |
| 6,983,156 B2 | 1/2006 | Fukushima et al. | |
| 7,346,365 B1 * | 3/2008 | Hovers et al. | 455/550.1 |
| 2003/0041048 A1 * | 2/2003 | Balasuriya | 707/1 |
| 2003/0126211 A1 | 7/2003 | Anttila et al. | |
| 2004/0209580 A1 | 10/2004 | Bose et al. | |
| 2005/0243785 A1 * | 11/2005 | Sabat et al. | 370/338 |

* cited by examiner

*Primary Examiner*—Salman Ahmed
*Assistant Examiner*—Blanche Wong
(74) *Attorney, Agent, or Firm*—Parks IP Law LLC; Jonathan A. Paulis

(57) ABSTRACT

Communications in a wireless communication system based on two or more communication standards are configured for delivery to cell sites or to subscribers using a digital link having channels assigned to the two or more communication standards. A T-1 level can be divided into twenty four channels that are assigned to two or more mobile standards, and subscriber or network communications based on the two or more standards can be delivered to, for example, radio transmitters associated with the mobile standards. Channel allocation can be revised based upon requested capacity associated with the mobile standards.

13 Claims, 3 Drawing Sheets

GSM/TDMA

NETWORKS AND METHODS INTEGRATING DIGITAL MOBILE STANDARDS

RELATED APPLICATIONS

This application claims the benefit of U.S. patent application Ser. No. 10/445,173 filed May 23, 2003 and to U.S. Provisional Patent Application No. 60/383,477, filed May 24, 2002. Both applications are incorporated herein by reference.

TECHNICAL FIELD

The disclosure pertains to multi-standard mobile communication methods and apparatus.

BACKGROUND

Wireless communication systems continue to evolve in order to provide subscribers alternative or enhanced services, and to permit more efficient use of available radio bandwidth. For example, wireless communication systems have successfully migrated from an all analog configuration (AMPS) to standards that provide digital communication such as IS-136. In such service migrations, continued support for an installed standard is generally necessary in order to maintain service for current subscribers. If services provided according to a particular standard are discontinued, then subscriber service can be disrupted while subscribers acquire new mobile stations or other hardware, or reconfigure installed hardware to conform to newly introduced requirements. Because of the disruption, inconvenience, and expense associated with service migration, service migration can prompt subscribers to consider subscribing to services offered by other service providers. Because service providers consider retaining current customers to be an important business objective, installed services continued to be offered and supported as new features or services are added.

In a typical mobile network, radio transmitters and associated antennas are remotely located at numerous cell sites, and communication with the remote cell sites is accomplished using a wired connection, typically a digital link based on, for example, a so-called T-1 level. Generally the introduction of services based on new or additional standards requires providing additional digital or other communication links to the cell sites as well as additional transmitters and antennas. The cost of additional digital links to the cell sites can be substantial, and in some cases, additional links must be installed. Thus, providing dedicated digital links or other communication links to cell sites to support each available mobile standard can be prohibitively expensive. Therefore, methods and apparatus that facilitate multi-standard operations are needed.

SUMMARY

Communication methods comprise selecting a digital transmission link having an available data rate and dividing the available data rate into a plurality of data channels. A first communication channel is assigned to communications based on a first communication standard and a second communication channel is assigned to communications based on a second communication standard. In representative examples, the available data rate corresponds to a Trunk Level 1 (T-1) data rate, and the data rate is divided into twenty four channels. In other examples, the available data rate corresponds to an E-1 data rate, and the data rate is divided into thirty two channels. In other representative examples, the data channels are associated with time slots. In other examples, the first communication standard corresponds to a GSM standard, and the second communication standard corresponds to an IS-136 standard.

Multiplexers for wireless communication comprise a first input configured to receive a communication based on a first communication standard and insert the received first communication into a first channel defined on a transmission link. A second input is configured to receive a communication based on a second communication standard and insert the received second communication into a second channel defined on the transmission link. In representative examples, an output is configured to deliver the first communication and the second communication to a destination. According to representative examples, the first communication standard is based on a GSM standard or an IS-136 standard. In other examples, the first communication standard is an analog communication standard. In additional examples, the transmission link is based on a T-1 level or an E-1 level.

Methods of processing communications for wireless distribution comprise extracting a first communication and a second communication associated with a first communication standard and a second communication standard, respectively, from a transmission link. The first communication and second communication are delivered to a first radio transmitter and a second radio transmitter, respectively. Additional methods of processing communications for wireless distribution comprise inserting a first communication and a second communication associated with a first communication standard and a second communication standard, respectively, into respective time slots on a digital link. The first communication and the second communication are delivered to a destination on the digital link. In representative examples, the digital link is associated with an E-1 or a T-1 level.

Methods of allocating digital link capacity comprise dividing a digital link into a plurality of channels and assigning communications based on at least two mobile standards to respective channels. In some examples, the channels are associated with time slots defined in the digital link. In representative examples, the digital link is based on a T-1 level and is divided into twenty four channels. In additional examples, the digital link is based on an E-1 level and is divided into thirty two channels. In additional representative examples, the at least two mobile standards include at least one of IS-136, GSM, and IS-95.

Multi-standard mobile communication systems comprise a cell site having a first radio transmitter and a second radio transmitter associated with a first mobile standard and a second mobile standard, respectively. A digital link that is configured to communicate with the cell site has at least one channel assigned to the first mobile standard and at least one channel assigned to the second mobile standard. A controller is configured to select a number of channels assigned to the first communication standard and the second communication standard.

Demultiplexers for wireless communication comprise an input configured to receive a signal associated with a digital link. A processor is configured to identify a communication associated with a first channel of the digital link and a communication associated with a second channel of a communication link. A first output is configured to receive the communication associated with the first channel of the digital link, and a second output is configured to receive the communication associated with the second channel. In representative examples, the first communication is associated with a first communication standard and the second communication is associated with a second communication standard that is different than the first communication standard. In particular examples, at least one of the first and second communication standards is a GSM standard or an IS-136 standard. In additional examples, the processor is configured to identify communications based on channels defined in a T-1 or and E-1 level.

Methods of sharing transmission capacity of a transmission medium comprise selecting a first communication protocol and a second communication protocol, and assigning portions of the transmission capacity to the first communication protocol and the second communication protocol. In some examples, the transmission medium is associated with a T-1 level. In other examples, at least one of the first and second communication protocols is associated with a GSM standard, an IS-136 standard, or an IS-95 standard. In a particular example, the first protocol is an IS-136 protocol and the second protocol is a GSM protocol. In another representative example, the first protocol is a W-CDMA protocol and the second protocol is a GSM protocol. In yet another representative example, the first protocol is an IS-95 protocol and the second protocol is a W-CDMA protocol or the first protocol is a GSM protocol and the second protocol is a cdma2000 protocol.

These and other features are described below with reference to the accompanying drawings.

DETAILED DESCRIPTION

Integration of multiple communication standards in a communication network that includes a wireless network typically requires providing dedicated hardware corresponding to each standard or protocol for each base station, substantially increasing network costs. As a result, services associated with newer or different communication standards remain unavailable to network subscribers. In some networks, additional facilities are unavailable for implementation of so-called second generation (2G), second and one-half generation (2.5G), and third generation (3G) technologies. Surprisingly, a single carrier system can be configured to support different wireless technologies such as the Digital Advanced Mobile Phone Service (D-AMPS) standard and the Global System for Mobile Communication (GSM) standard. D-AMPS and GSM use time division multiple access (TDMA) but in substantially different formats, and communication signals conforming to these standards cannot be directly combined. However, by configuring a digital cross-connect so that signal timeslots at a cell site or elsewhere in a network are mapped to a selected standard or technology, signals associated with these timeslots can be delivered to, or received from, systems associated with the selected standard or technology. Network complexity and cost can be reduced by, for example, avoiding installation of additional DS-1 or other links to communicate signals associated with a standard that is to be added to the network service.

Examples are described with reference to D-AMPS and GSM. For convenience, D-AMPS is referred to as Interim Standard 136 (IS-136), or more simply as "TDMA." In other examples, additional standards can be included, such as standards based on code division multiple access (CDMA) or other mobile standards. For example, protocols such as those described in IS-95, cdma2000, wideband code-division multiple-access (W-CDMA) standards can be used.

Figure 1:
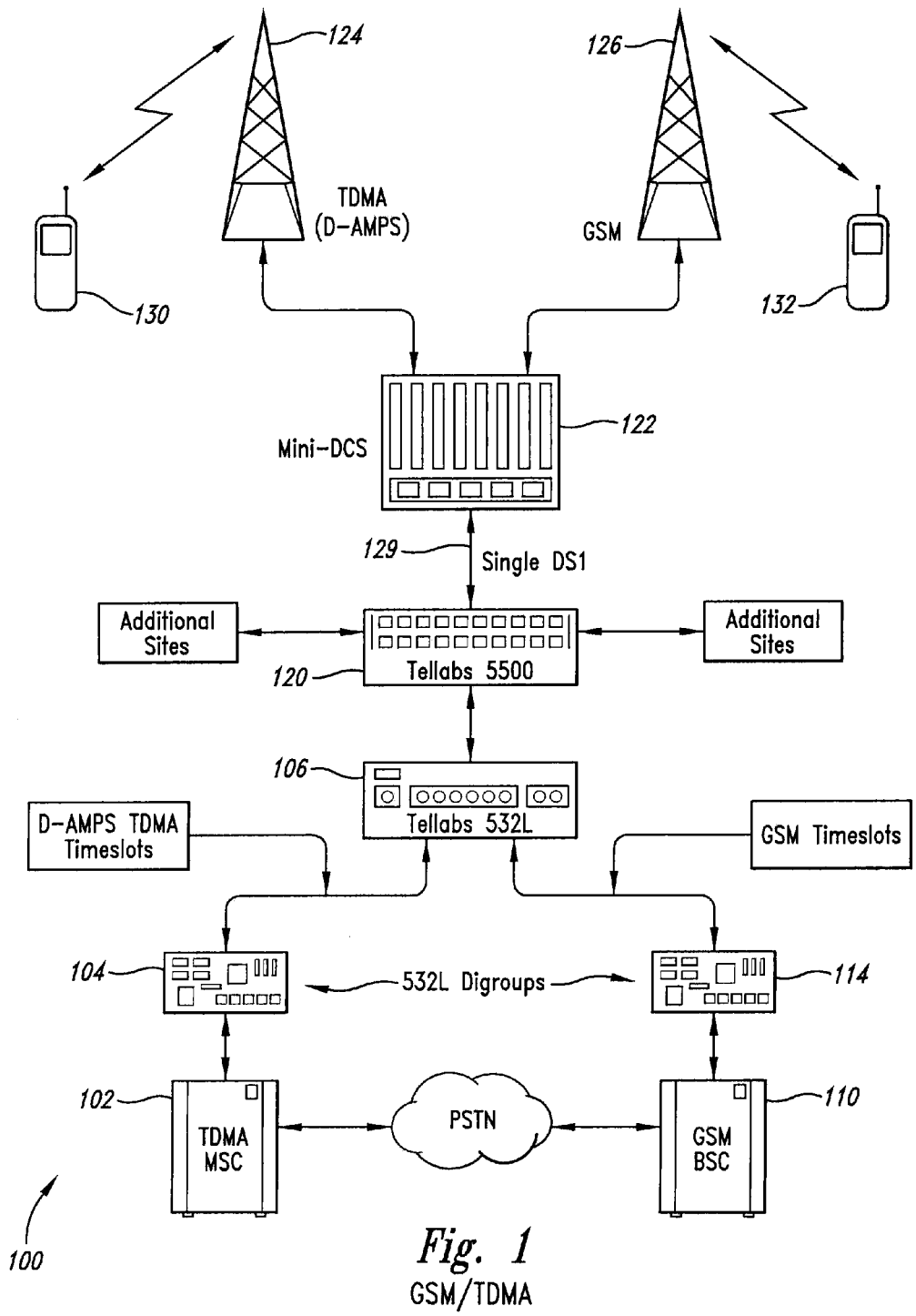
FIG. 1 is a schematic diagram of a wireless communication system configured to transmit and receive communication signals associated with a Digital Advanced Mobile Phone System (D-AMPS) standard and a Global System for Mobile Communication (GSM) standard.

With reference to FIG. 1, a communication system 100 is configured based on GSM and D-AMPS, but other data or voice standards can be included such as, for example, the Personal Digital Cellular (PCS) standard, the Integrated Digital Enhanced Network (IDEN) standard, Internet Protocol (IP), or other standards. A mobile switching center (MSC) 102 is configured to receive voice and/or data or other signals associated with D-AMPS and deliver these signals to D-AMPS processor 104 of a digital cross-connect system (DCS) 106 such as, for example, a broadband digital cross-connect system such as a Tellabs 532L available from Tellabs, Inc., Naperville, Ill. The DCS 106 can be used to terminate DS-1, DS-3, and/or STS-1 signals and perform a cross-connect function at a DS0 signal rate. Cross-connections can be selected via instructions provided to the DCS 106 from, for example, a local central office or other location, such as an operations center. Services can be provided by the DCS 106 in association with so-called T-1 or E-1 rates. Typically, the DCS 106 can support numerous DS1 equivalents. The DCS 106 also includes a GSM processor 114 configured to receive signals based on a GSM standard from a base station controller (BSC) 110. The DCS 106 is configured to combine D-AMPS signals, GSM signals, and associated control signals received from the processors 104, 114, and to distribute separated signals to the processors 104, 114 for forward or reverse channel communication. As shown in FIG. 1, the processors 104, 114 are each configured to process signals for up to twelve channels of a 24-channel DS1 level.

The combined GSM/D-AMPS signals are provided to a broadband cross-connect 120 such as a Tellabs 5500 that directs signal portions to selected cells. A narrowband digital cross-connect (DCS) 122, such as, for example, an Adit 600 available from Carrier Access Corporation, Boulder, Colo., receives combined signals selected for delivery to antennas 124, 126 at a selected cell site so that D-AMPS portion are delivered to a D-AMPS antenna 124, and GSM portions are delivered to a GSM antenna 126, respectively, that transmit signals to and receive signals from respective mobile stations 130, 132. The antennas 124, 126 are illustrated on separate towers, but typically the antennas 124, 126 are supported on a single tower.

Digital signals in the system 100 are conveniently described with reference to a digital signal level DS0 that provides digital voice/data/control at a rate of 64 kbit/sec and a digital signal level DS1 that provides digital voice/data/control at a rate of about 1.544 Mbit/sec. In the example of FIG. 1, the DCS 106 and the DCS 122 are configured to receive and combine as many as 24 DS0 signals or to receive a DS1 signal and extract as many as 24 DS0 signals so that the DCS 122 and the broadband cross-connect 106 can communicate GSM and D-AMPS voice/data over a single DS1 connection 129. In additional examples, the DSC 106 and the DSC 122 can be configured to combine signals into one or more DS1 signals or to extract DS0 signals from several DS1 signals.

Figure 2:
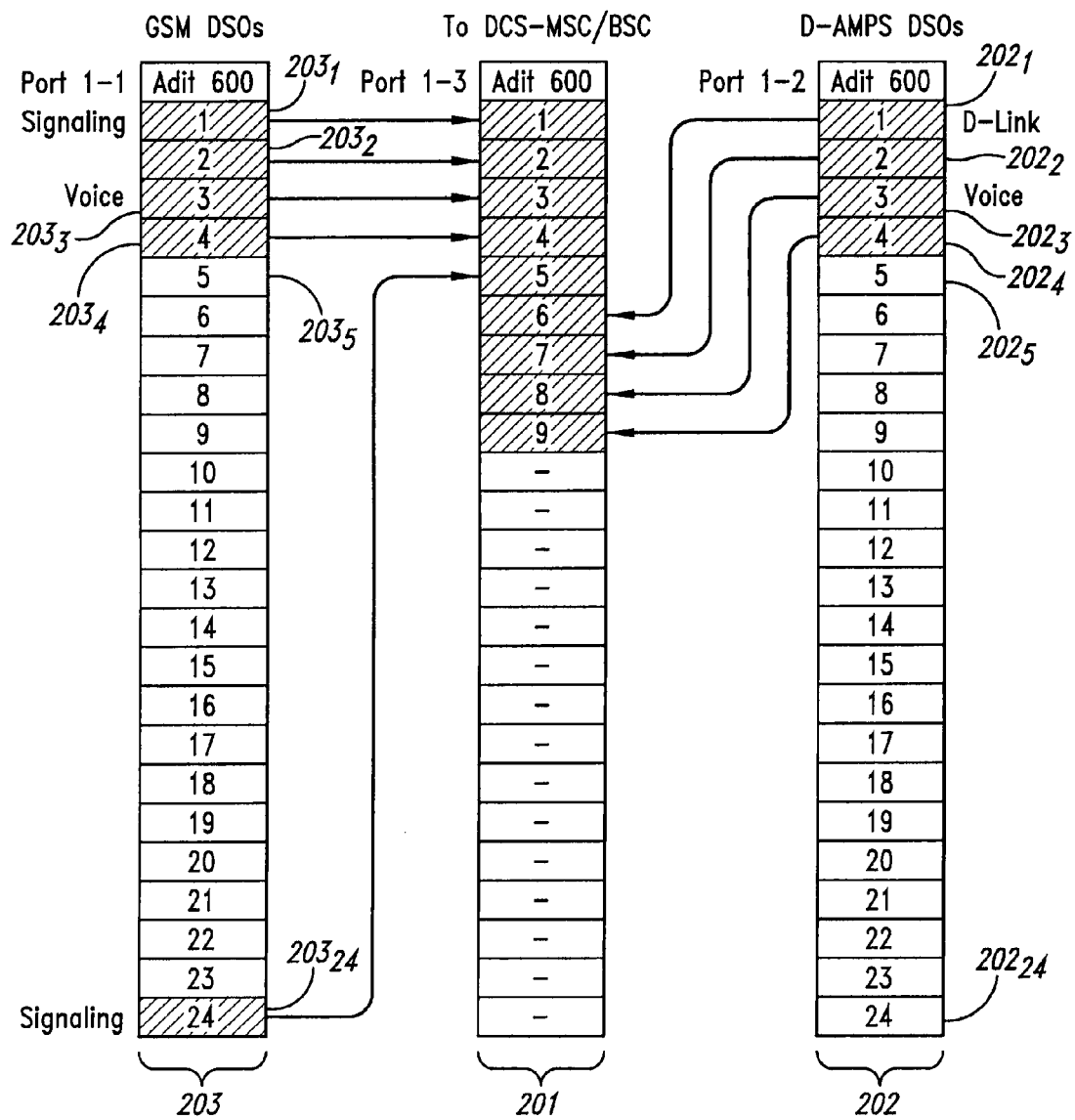
FIG. 2 is a schematic diagram illustrating a representative assignment of D-AMPS and GSM signals to time slots in a DS1 signal.

Combination and separation of D-AMPS and GSM signals are described with reference to FIG. 2. For convenience, FIG. 2 illustrates formation of a DS1 signal 201 from a set of DS0 signals 202 provided by a D-AMPS based network and a set of DS0 signals 203 provided by a GSM-based network. Either of the sets 202, 203 can include as many as 24 DS0 equivalents, but in order to combine the D-AMPS and the GSM signals into a single DS1 signal, a total number of timeslots used by the sets 202, 203 is less than twenty four. Typically, the D-AMPS set 202 and the GSM set 203 are associated with respective DS1 rate signals in which one or more time slots are unoccupied.

As shown in FIG. 2, D-AMPS time slots $202_3$, $202_4$ are associated with voice communication, and time slots $202_1$, $202_2$ are associated with a data link. Time slots $202_5$-$202_{24}$ are unused. The GSM set 203 includes time slots $203_3$, $203_4$ associated with voice channels and time slots $203_1$, $203_2$, and $203_{24}$ that are associated with signaling. Time slots $203_5$-$203_{23}$ are unused. In the representative mapping of FIG. 2, time slots $203_1$-$203_4$, $203_{24}$ and $202_1$-$202_4$ of the GSM set 203 and the D-AMPS set 202 are mapped to respective time slots $201_1$-$201_9$ of the DS1 signal 201. A similar DS1 signal that is received can be similarly unmapped and associated mappings and unmappings can be executed by the DSC 106 and the DSC 122.

The mapping of FIG. 2 can be selected based on DS0 mappings in the BSC 110 that can be determined by, for example, issuing computer executable instructions to request that timeslots used for signaling paths and voice paths be reported. Additional computer executable instructions can be provided to determine the state of radio transmitters/receivers and an associated pulse code modulation. In a representative example, a first DS0 slot and a second DS0 slot are used for D-link control, and the remaining voice paths can be identified using computer executable instructions. As noted above, GSM signals and D-AMPS signals can be combined into a single DS1 signal or extracted from a DS1 signal to form two DS1 signals.

The preceding example provides connection of GSM and D-AMPS signals to a cell site via a single DS1 connection. In other examples, additional signal types can be included so that communication of multi-standard data can be performed using a common communication link such as a DS1 link. In additional examples, multi-standard data is mapped into time slots of one or more DS1 or higher signal levels. The above example is described with reference to D-AMPS and GSM, but signals associated with other signal types can be similarly mapped into time slots of one or more DS1 levels, or otherwise combined.

Figure 3:
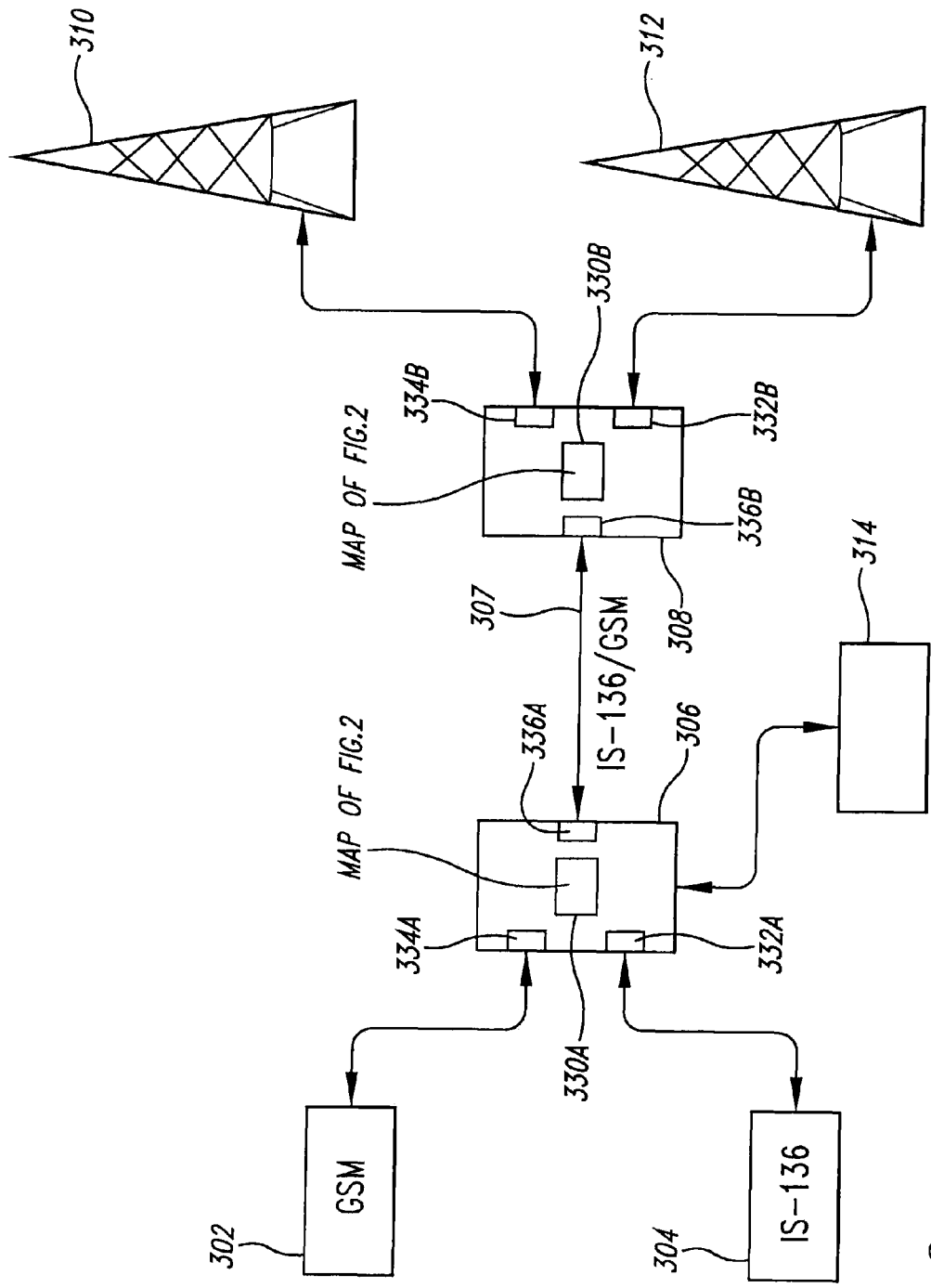
FIG. 3 is a schematic block diagram of a multi-standard mobile communication system that includes a controller configured to selected numbers of channels assigned to one or more mobile standards.

With reference to FIG. 3, a multi-standard mobile communication system 300 includes a GSM-based switching center 302 and an IS-136 based switching center 304 that are in communication with a digital access and cross-connect system (DACS) 306. The DACS 306 is in communication with a DACS 308 via a digital link 307. The DACS is in communication with a GSM-based transmitter/antenna 310 and an IS-136-based transmitter/antenna 312. The DACS 306 is configured to receive communications form the switching centers 302, 304 are assigned the communications to channels defined on the communication link 307. Typically the communication link 307 is associated with a so-called digital signal (DS) level, such as a DS-1 level that can provide twenty four channels having data rates of about 64 kbit/sec, but the communication link can be configured based on higher or lower bit rates. Communication link channels are conveniently defined as time slots in the DS-1 or other signal level, and one or more of the channels can be assigned to communications with the switching centers 302, 304. A controller 314 can be configured to communicate with the DACS 306 and estimate numbers of channels needed to maintain appropriate service levels with each of the switching centers 302, 304. Based upon these estimates, the controller 314 can direct the DACS 306 and the DACS 308 to re-allocated channels based upon current network requirements. For examples, if GSM-based service is added to a mobile network, then the initial GSM usage is likely to be relatively low, and only a few channels can be assigned to GSM communications. As GSM usage grows, additional channels can be allocated to GSM communication. As older services become less well used, channels allocated to these older services can be allocated to services having higher demands. The controller can be configured to prompt channel reallocation, or to report usage statistics to a channel operator who can approve requested changes in allocation, or otherwise reallocate capacity. In some cases, the controller is configured to interrogate system components to determine existing channel allocations prior to altering channel assignments.

It will be apparent that the representative methods and apparatus described above can be modified in arrangement and detail, and I claim all that is encompassed by the appended claims.

We claim

1. A multi-standard mobile communication system comprising:
 a first radio transmitter configured to transmit communications using a first communication standard;
 a second radio transmitter configured to transmit communications using a second communication standard different from the first communication standard;
 a digital link, transmitting at a T-1 data rate or an E1 data rate, the digital link comprising a plurality of channels;
 a controller configured to direct a demultiplexer to allocate a first channel of the plurality of channels to the first communication standard and to allocate a second channel of the plurality of channels to the second communication standard;
 the demultiplexer comprising:
  a communication link with the controller;
  an input configured to receive a multiplexed signal on the plurality of channels of the digital link;
  a processor configured to:
   allocate the first channel of the plurality of channels to the first communication standard and the second channel of the plurality of channels to the second communication standard in response to a direction to do so received from the controller over the communication link; and
   identify a first communication within the multiplexed signal received on the first channel of the plurality of channels of the digital link and a second communication within the multiplexed signal received on the second channel of the plurality of channels of the digital link;
  a first output configured to deliver the first communication to a first destination; and
  a second output configured to deliver the second communication to a second destination;
  wherein the processor is configured to identify the first and second communications within the multiplexed signal received on the first and second channels, respectively, of the plurality of channels received at the T-1 data rate or the E-1 data rate.

2. The system of claim 1, wherein the first communication standard is an IS-95 standard, a CDMA2000 standard, or a wideband code-division multiple access ("W-CDMA") standard.

3. The system of claim 1, wherein the first communication standard is GSM standard and the second communication standard is an IS-136 standard.

4. The system of claim 1, wherein the first communication standard uses a first Time Division Multiple Access ("TDMA") format the second communication standard uses a second TDMA format different from the first TDMA format.

5. A demultiplexer for use with a digital link, transmitting at a T-1 data rate or an E-1 data rate, the digital link comprising a plurality of channels, and a controller configured to direct the demultiplexer to allocate a first channel of the plurality of channels to a first communication standard and to allocate a second channel of the plurality of channels to a second communication standard that is different from the first communication standard, the demultiplexer comprising:
  a communication link with the controller;
  an input configured to receive a multiplexed signal on the plurality of channels of the digital link;
  a processor configured to:
    allocate the first channel of the plurality of channels to the first communication standard and the second channel of the plurality of channels to the second communication standard in response to a direction to do so received from the controller over the communication link; and
    identify a first communication within the multiplexed signal received on the first channel of the plurality of channels of the digital link and a second communication within the multiplexed signal received on the second channel of the plurality of channels of the digital link;
  a first output configured to deliver the first communication to a first destination; and
  a second output configured to deliver the second communication to a second destination;
  wherein the processor is configured to identify the first and second communications within the multiplexed signal received on the first and second channels, respectively, of the plurality of channels received at the T-1 data rate or the E-1 data rate.

6. The demultiplexer of claim 5, wherein at least one of the first and second communication standards is a GSM standard or an IS-136 standard.

7. The demultiplexer of claim 5, wherein the first communication standard is an IS-95 standard, a CDMA2000 standard, or a wideband code-division multiple access ("W-CDMA") standard.

8. The demultiplexer of claim 5, wherein the first communication standard is a GSM standard the second communication standard is an IS-136 standard.

9. The demultiplexer of claim 5, wherein the first communication standard uses a first Time Division Multiple Access ("TDMA") format and the second communication standard uses a second TDMA format different from the first TDMA format.

10. A method for operating a demultiplexer for use with a digital link, transmitting at a T-1 data rate or an E-1 data rate, the digital link comprising a plurality of channels, and a controller configured to direct the demultiplexer to allocate a first channel of the plurality of channels to a first communication standard and to allocate a second channel the plurality of channels to a second communication standard that is different from the first communication standard, the method comprising:
  receiving, at an input of the demultiplexer, a multiplexed signal on the plurality of channels of the digital link;
  allocating, via a processor of the demultiplexer, the first channel of the plurality of channels to the first communication standard and the second channel of the plurality of channels to the second communication standard in response to a direction to do so received from a controller that is in communication with the demultiplexer;
  identifying, via the processor of the demultiplexer, a first communication within the multiplexed signal received on the first channel of the plurality of channels of the digital link and a second communication within the multiplexed signal received on the second channel of the plurality of channels of the digital link;
  delivering, via a first output of the demultiplexer, the first communication to a first destination; and
  delivering, via a second output of the demultiplexer, the second communication to a second destination;
  wherein identifying, via the processor of the demultiplexer, the first and second communications within the multiplexed signal received on the first and second channels, respectively, of the plurality of channels received at the T-1 data rate or the E-1 data rate.

11. The method of claim 10, wherein the first communication standard is an IS-95 standard, a CDMA2000 standard, or a wideband code-division multiple access ("W-CDMA") standard.

12. The method of claim 10, wherein the first communication standard is a GSM standard and the second communication standard is an IS-136 standard.

13. The method of claim 10, wherein in accordance with the first communication standard, the first communication was divided into time slots for transmission using a first Time Division Multiple Access ("TDMA") format and in accordance with the second communication standard, the second communication was divided into time slots for transmission using a second TDMA format.

* * * * *